J. P. SIMONS & G. WALLACE.
ROTARY WATER-METERS.

No. 194,183. Patented Aug. 14, 1877.

UNITED STATES PATENT OFFICE.

JOHN P. SIMONS AND GEORGE WALLACE, OF SAN FRANCISCO, CALIFORNIA.

IMPROVEMENT IN ROTARY WATER-METERS.

Specification forming part of Letters Patent No. 194,183, dated August 14, 1877; application filed April 30, 1877.

*To all whom it may concern:*

Be it known that we, JOHN P. SIMONS and GEORGE WALLACE, of the city and county of San Francisco, and State of California, have invented a Rotary Water Engine and Meter; and we do hereby declare the following to be a full, clear, and exact description thereof, reference being had to the accompanying drawings.

Our invention relates to an improved rotary water-engine, which may also be used as a meter whenever desired; and it consists of a wheel having a grooved or slotted periphery, which has vanes so hinged as to stand radially in the groove and receive the impact of the water, or be folded down when passing the stationary abutment. The water acts by direct pressure upon these vanes, so as to rotate the wheel within its case, and the wheel is packed so as to be tight as far as the pressure is exerted upon each vane, but is loose and free for the remainder of its rotation. The groove is calculated to hold a certain amount of water between each pair of vanes, and when rotated freely it will serve to measure the amount of water passing through it. The shaft, being connected with any suitable indicator, will show at any time the amount of water which has passed.

Figure 1:
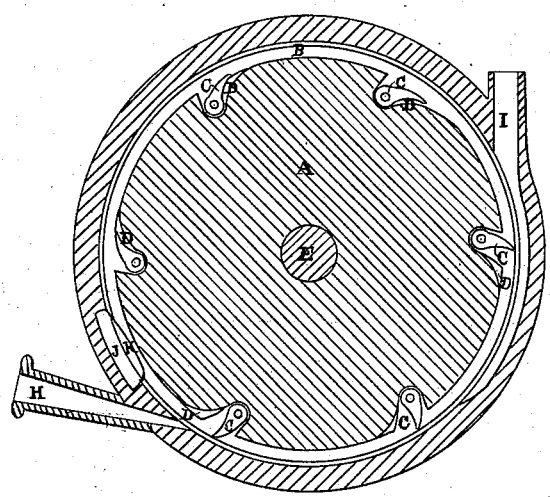
Figure 2:
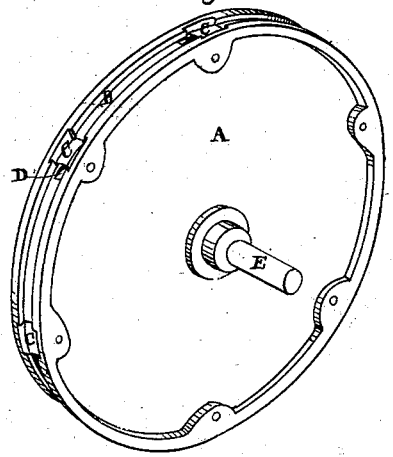
Figure 3:
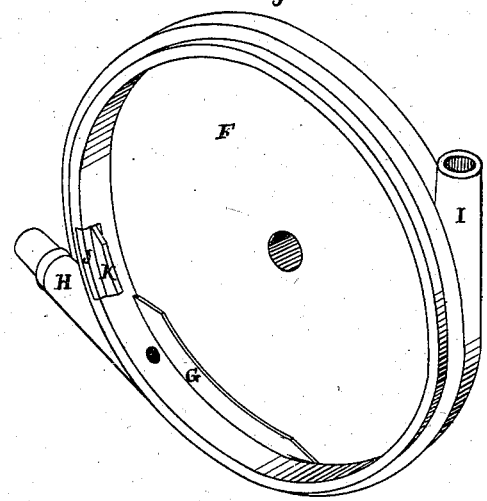
Figure 3:
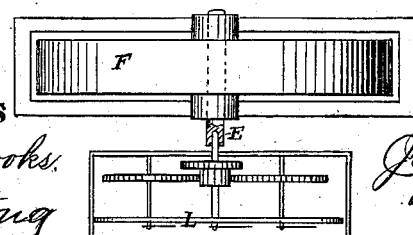

Referring to the accompanying drawings for a more complete explanation of our invention, Figure 1 is a sectional view of the wheel and case. Fig. 2 is a perspective view of the wheel. Fig. 3 is an interior view of the case, showing the packing and abutment.

A is a wheel or disk, which has an annular groove, B, formed in its face or periphery. At equal intervals around the circumference of this disk are placed vanes C, which are hinged below the bottom of the groove, so that they may stand up and just fill the groove level with its sides, or they may be laid down so as to be flush with its bottom. Before each of these vanes is a small slot, D, so arranged that as the water enters it will force the vane up to a radial position, and thus fill the groove.

This disk has an axle or shaft, E, and is fitted into a case, F, in which it turns freely, except in the arc where the water acts. This arc will be of a length equal to the distance between the vanes, and at each side of this arc plates G fit closely against the sides of the wheel, so as to serve as a packing and prevent leakage at this point. The inside rim of the case may also be made to fit closely over this arc for the same purpose.

Water is admitted by a pipe, H, just at the beginning of this arc, and allowed to exhaust through a pipe, I, at or near the end of the arc, the disk turning freely over the remainder of the circle.

It will be seen that as the water enters through the pipe H, it will, by means of the slots D, force the vanes up successively, and thus act, by its momentum, to turn the disk.

In order to prevent the escape of the water backward, a plate, J, is fitted into the rim of the case, and a tongue, K, projects from the plate into the groove in the disk, so as to make it water-tight. This tongue will also act to close all the vanes C down as they pass it, and they will be lifted again by the impact of the water as it enters.

It will also be manifest that the amount of water which passes through the machine can be exactly measured by making the groove-space between each pair of vanes of a known capacity. The axis of the wheel will then be connected with an indicator and dials, L, so that the amount of water passing may at any time be known, and the machine may be used either as an engine or as a meter.

Having thus described our invention, what we claim as new, and desire to secure by Letters Patent, is—

1. The rotary disk or wheel A, having the annular groove B formed in its periphery, and the vanes C so hinged as to stand radially and fill the groove or lie below it, in combination with the case F, with its ingress-pipe H and egress-pipe I, substantially as herein described.

2. The grooved wheel A, with its hinged vanes C fitted to rotate within the case F, said case being fitted with a plate, J, having a tongue, K, substantially as and for the purpose specified.

3. The disk A, having the annular groove B formed in its periphery, and the vanes C moving in the case F, said vanes closing down into the groove B, and having the slot D made in front of them, so that the pressure of the water will act to raise them into a radial position, substantially as herein described.

4. In combination with the grooved disk A, having a number of equidistant vanes, C, operating as shown, the case F, having plate J, with its tongue K, and the packing-plates G between the ingress and egress pipes, but constructed so as to allow the wheel to revolve freely through the remainder of the case, substantially as herein described.

5. The grooved disk A, radial vanes C, case F, having plates G, and plate J, with its tongue K and indicator L, all constructed and arranged to operate in the manner herein shown and described.

In witness whereof we have hereunto set our hands and seals.

JOHN P. SIMONS. [L. S.]
    GEO. WALLACE. [L. S.]

Witnesses:
 GEO. H. STRONG,
 OLWYN T. STACY.